(12) United States Patent
Aguirre et al.

(10) Patent No.: US 8,958,403 B2
(45) Date of Patent: Feb. 17, 2015

(54) WIDE AREA NETWORK (WAN) AND LOCAL AREA NETWORK (LAN) COMMUNICATIONS FOR A FIXED WIRELESS CPE

(75) Inventors: Sergio Aguirre, Southlake, TX (US); Raafat Edward Kamel, Little Falls, NJ (US); Kamlesh S. Kamdar, Dublin, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 650 days.

(21) Appl. No.: 13/053,500

(22) Filed: Mar. 22, 2011

(65) Prior Publication Data

US 2012/0243517 A1 Sep. 27, 2012

(51) Int. Cl.
*H04W 40/00* (2009.01)
*H04L 12/66* (2006.01)

(52) U.S. Cl.
CPC .................................... *H04L 12/66* (2013.01)
USPC ........................................................ 370/338

(58) Field of Classification Search
CPC ... H04L 1/0618; H04L 1/0003; H04L 1/0009; H04L 1/06; H04L 1/0026; H04L 1/0606; H04L 47/10; H04L 47/20; H04L 47/32; H04L 47/2441
USPC .................. 370/338, 346, 349, 350, 230, 235
See application file for complete search history.

(56) References Cited

U.S. PATENT DOCUMENTS

| | | | | |
|---|---|---|---|---|
| 6,067,290 | A * | 5/2000 | Paulraj et al. | 370/329 |
| 7,561,593 | B1 * | 7/2009 | Wilkie | 370/450 |
| RE41,655 | E * | 9/2010 | Woodhead et al. | 455/522 |
| 2005/0179607 | A1 | 8/2005 | Gorsuch et al. | |
| 2007/0173303 | A1 | 7/2007 | Viorel et al. | |
| 2009/0180377 | A1 * | 7/2009 | Sullivan et al. | 370/230 |
| 2010/0311321 | A1 | 12/2010 | Norin | |
| 2010/0313232 | A1 | 12/2010 | Norin | |

* cited by examiner

*Primary Examiner* — Faruk Hamza
*Assistant Examiner* — Jean F Voltaire

(57) ABSTRACT

An outdoor broadband unit includes a wide area network (WAN) side device, and a local area network (LAN) side device. The LAN side device provides a first stay alive communication to the WAN side device, and the WAN side device performs a soft reset based on the stay alive communication. The LAN side device also receives, based on the stay alive communication, a soft reset result from the WAN side device, and determines, based on the soft reset result, whether the soft reset of the WAN side device is successful or unsuccessful. The LAN side device further provides a second stay alive communication to the WAN side device when the soft reset of the WAN side device is successful.

20 Claims, 11 Drawing Sheets

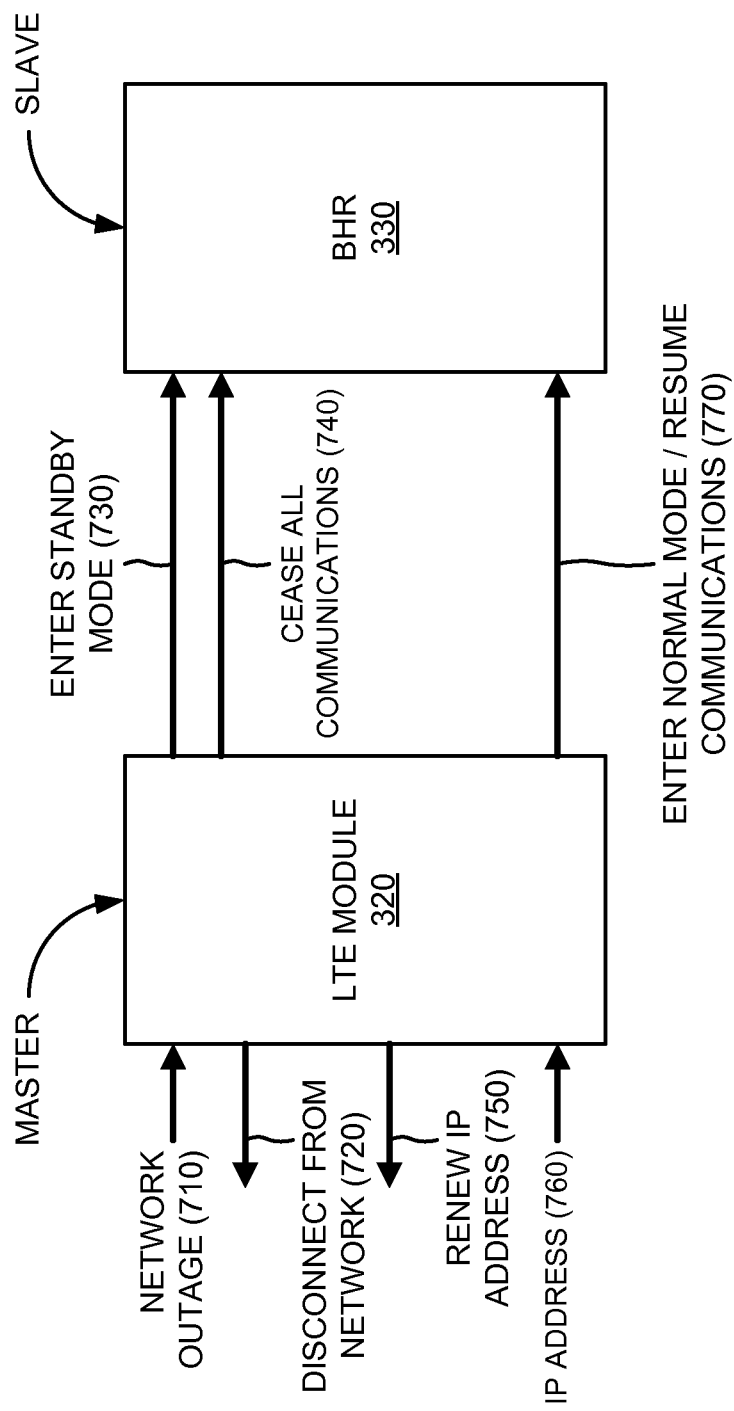

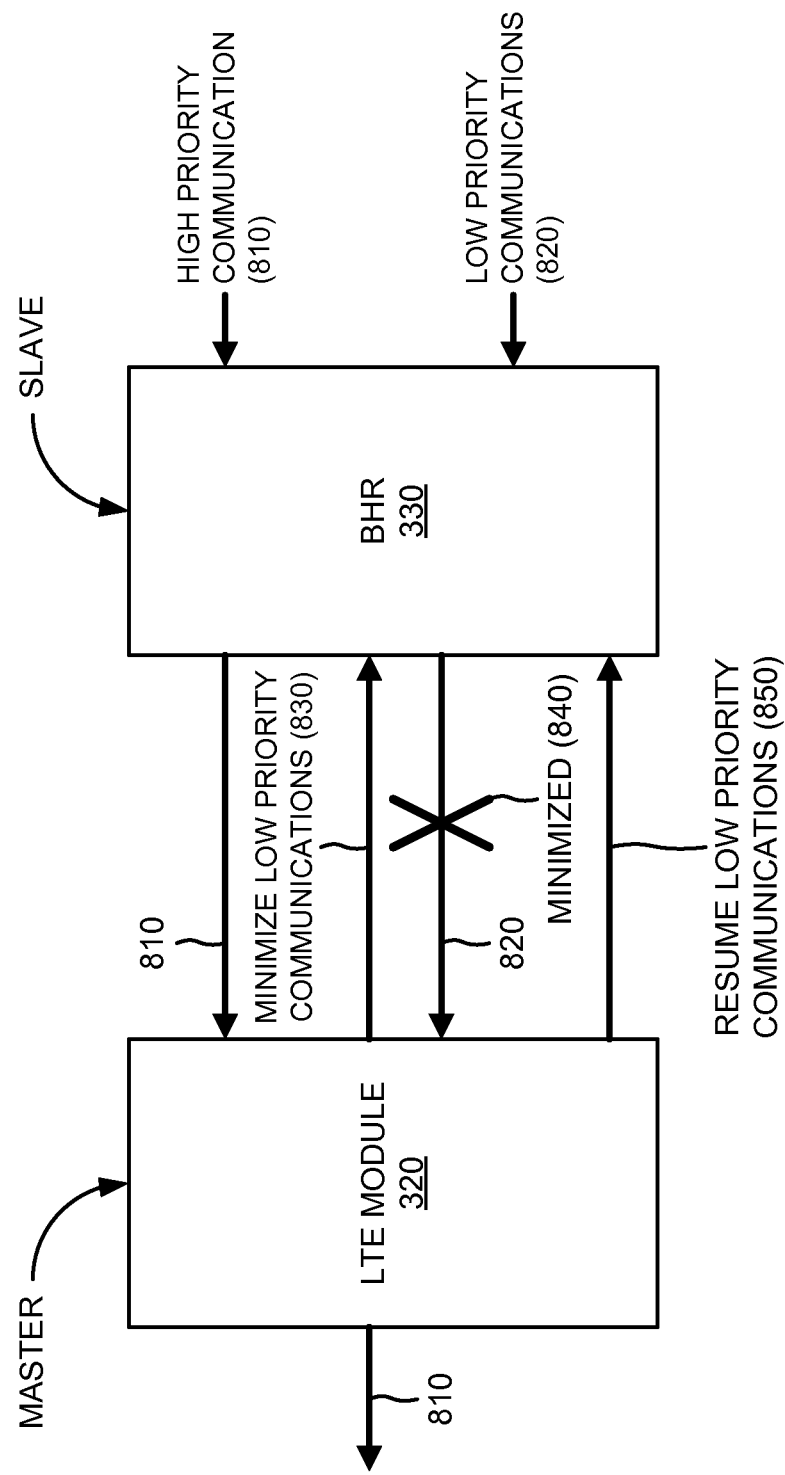

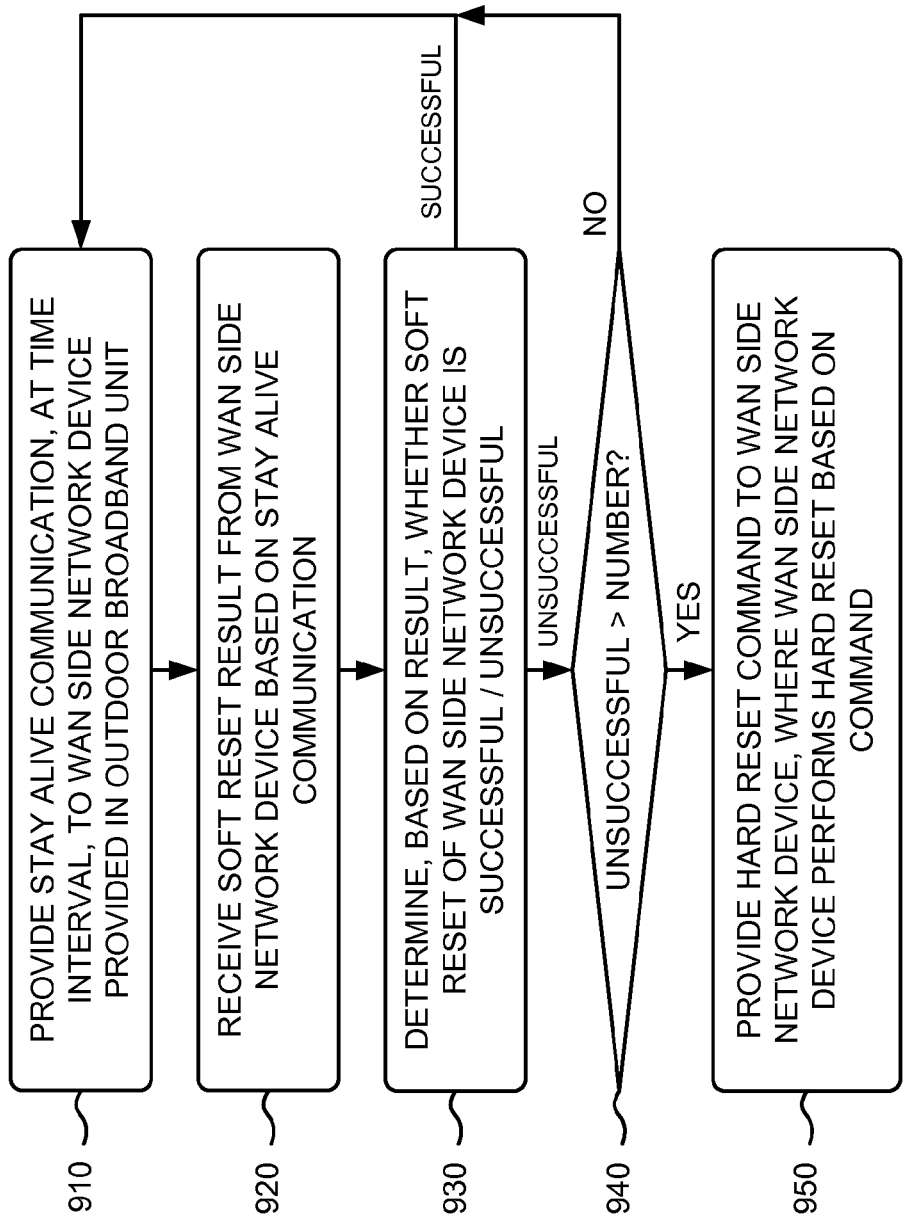

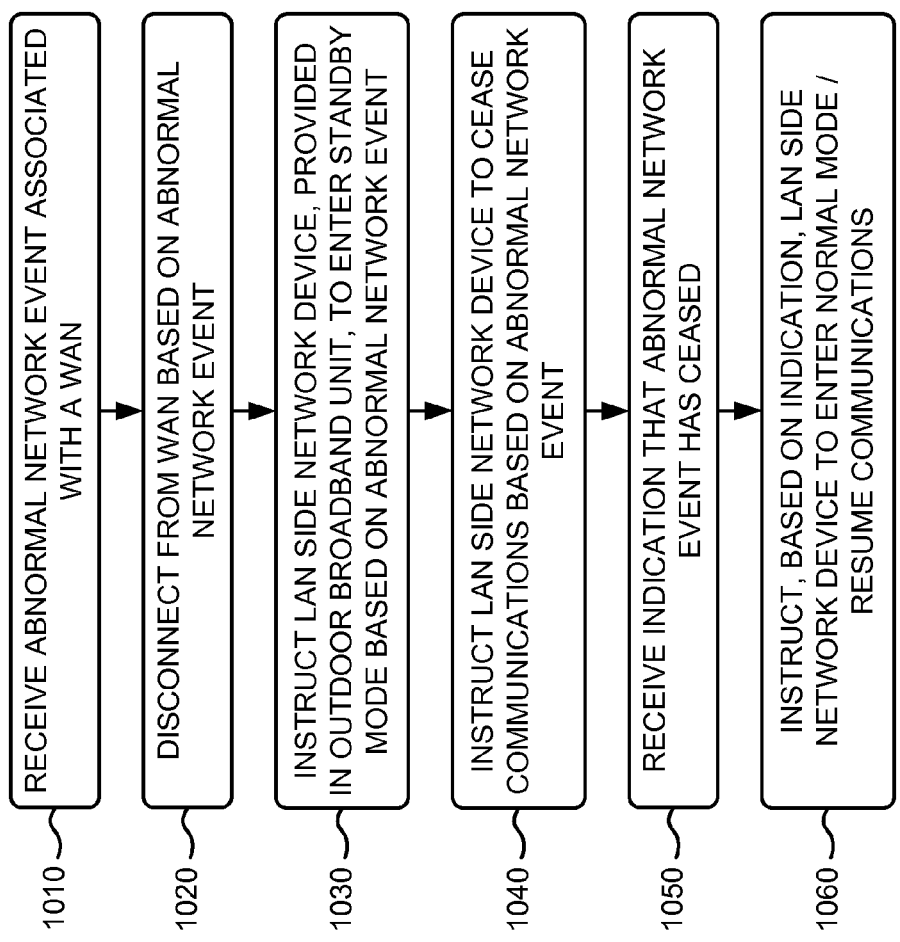

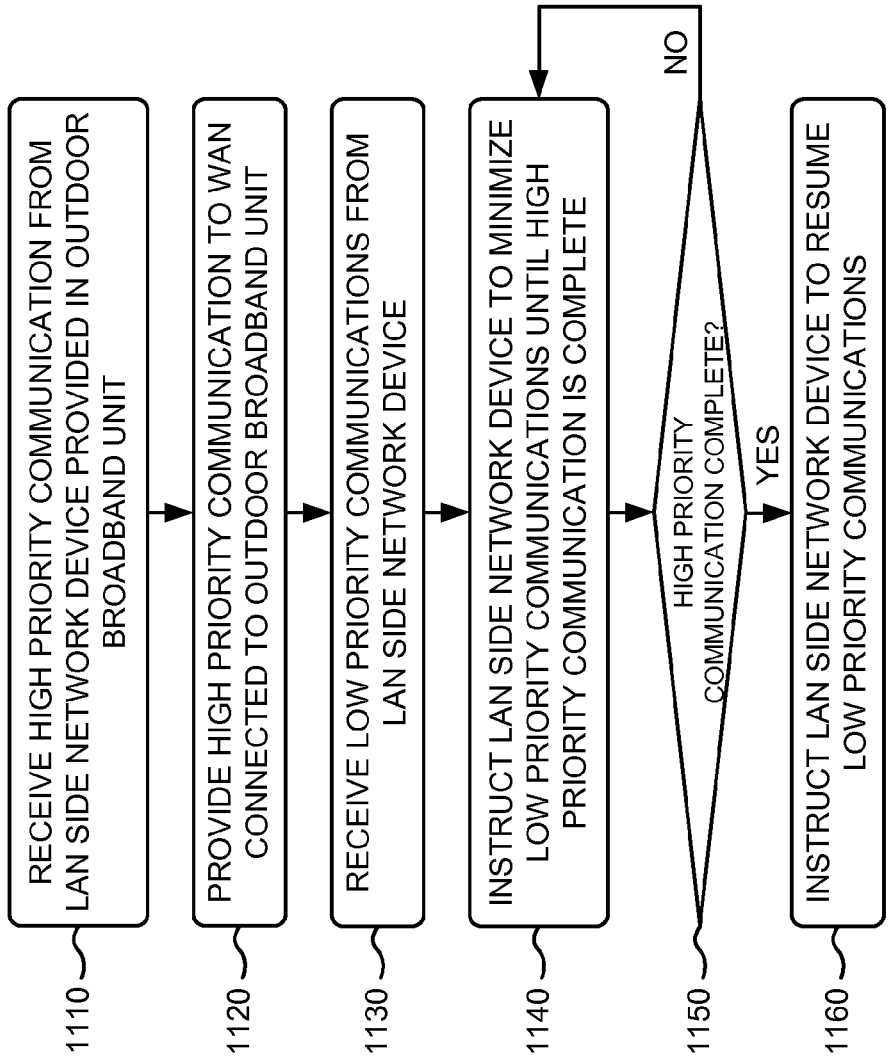

WIDE AREA NETWORK (WAN) AND LOCAL AREA NETWORK (LAN) COMMUNICATIONS FOR A FIXED WIRELESS CPE

BACKGROUND

Bundled media services, such as combination packages of television, telephone, and broadband Internet services, have been successfully offered to households with wired connections to service provider networks. Households in areas without such wired connections (e.g., customers in regions that cannot be reached via conventional communication media, such as optical cables, copper cables, and/or other fixed wire-based technologies) may rely on fixed wireless networks for some of these services (e.g., broadband access). However, previous generations of fixed wireless networks have generally been unsuccessful. Expensive network equipment and customer premises equipment (CPE), high CPE installation costs, use of proprietary technology, and low data rates are among some of the reasons that these fixed wireless networks remained unpopular.

As wireless network data rates improve using fourth generation (4G) technologies, such as Long-Term Evolution (LTE), such network data rates have made it easier to implement fixed wireless networks. However, fixed wireless networks struggle to provide a mechanism that enables wireless protocols (e.g., associated with LTE network) to effectively communicate with Internet protocols (e.g., associated with customer premises equipment).

BRIEF DESCRIPTION OF THE DRAWINGS

FIG. 7 is a diagram of other example operations capable of being performed by an example portion of the outdoor broadband unit;

FIG. 8 is a diagram of further example operations capable of being performed by an example portion of the outdoor broadband unit;

FIG. 9 is a flow chart of an example process for maintaining communications between a wide area network (WAN) side and a local area network (LAN) side of the outdoor broadband unit according to implementations described herein;

FIG. 10 is a flow chart of an example process for handling abnormal network events with the outdoor broadband unit according to implementations described herein; and FIG. 11 is a flow chart of an example process for handling high priority communications with the outdoor broadband unit according to implementations described herein.

DETAILED DESCRIPTION OF PREFERRED EMBODIMENTS

The following detailed description refers to the accompanying drawings. The same reference numbers in different drawings may identify the same or similar elements.

Systems and/or methods described herein may provide a customer premises equipment (CPE) wireless architecture that includes combined gateway equipment. The combined gateway equipment may include satellite and radio frequency (RF) antennas that are mounted (e.g., on a roof), by an installer, at a customer premises. The RF antenna may be associated with an outdoor broadband unit that includes a WAN side device (e.g., a LTE module) capable of communicating with a wireless network, such as a WAN. The outdoor broadband unit may also include a LAN side device (e.g., a broadband home router (BHR)) capable of communicating with a LAN, such as a customer premises network. The LTE module and the BHR may communicate with one another to enable communications between the WAN and the LAN.

In one example implementation, the BHR may enable communications to be maintained with the LTE module via stay alive communications. In another example implementation, during abnormal WAN events (e.g., a network outage, a network overload, etc.) the LTE module may disconnect from the WAN and may instruct the BHR to cease communications with the LTE module. In still another example implementation, when the LTE module receives high priority communications (e.g., an emergency, "911," or "E911" call), the LTE module may instruct the BHR to minimize lower priority communications (e.g., content download) with the LTE module.

Figure 1:
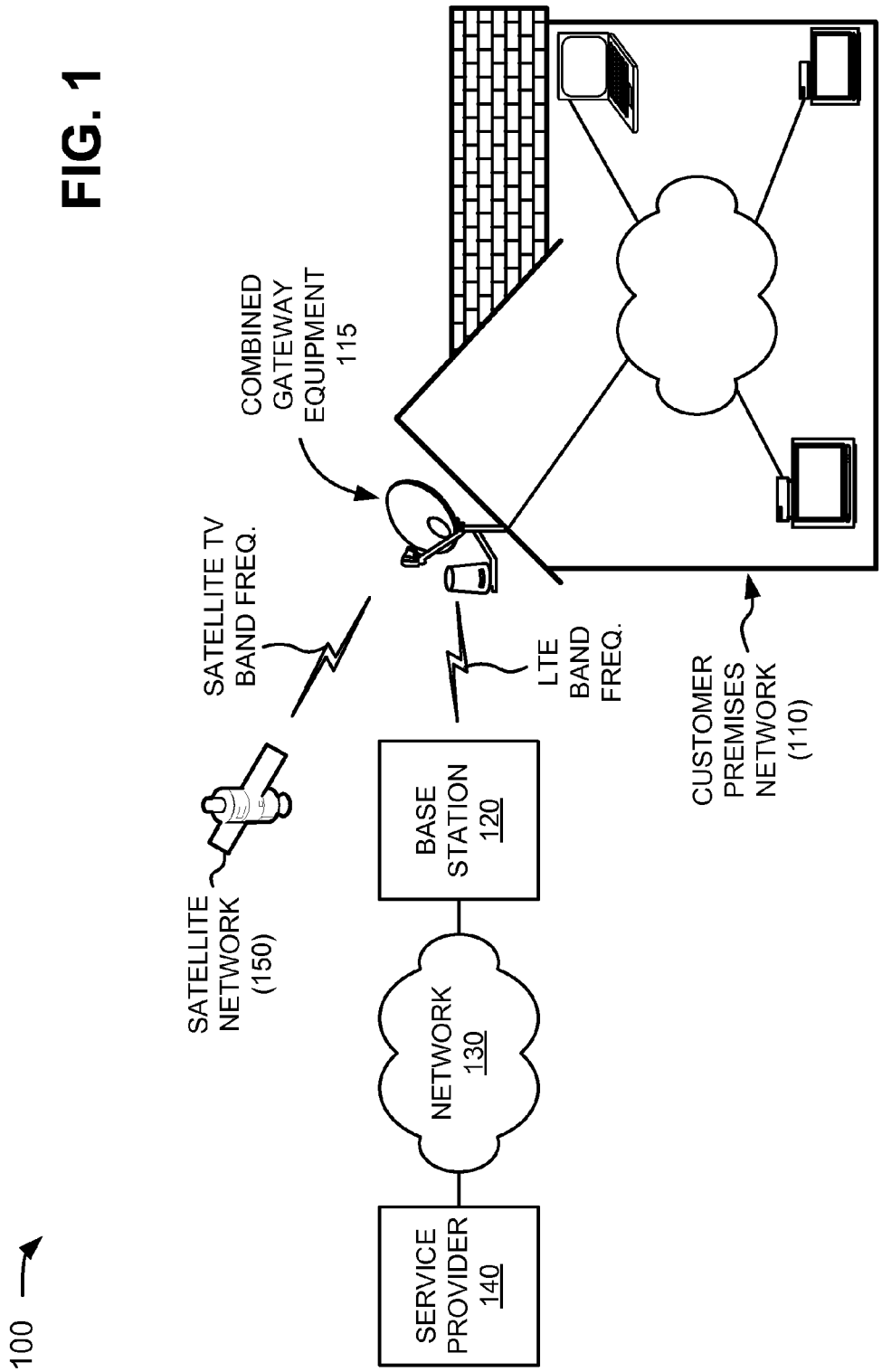
FIG. 1 is a diagram of an example environment in which systems and/or methods described herein may be implemented.

FIG. 1 is a diagram of an example environment 100 in which systems and/or methods described herein may be implemented. As illustrated, environment 100 may include a customer premises network 110, combined gateway equipment 115, a base station 120, a network 130, a service provider 140, and a satellite network 150. A single customer premises network 110, base station 120, network 130, service provider 140, and satellite network 150 have been illustrated in FIG. 1 for simplicity. In practice, there may be more customer premises networks 110, combined gateways 115, base stations 120, networks 130, service providers 140, and/or satellite networks 150.

Customer premises network 110 may include one or more devices connected to each other, base station 120, and/or satellite network 150. Devices in customer premises network 110 may include, for example, set-top boxes (STBs), televisions, computers, and home networking equipment (e.g., routers, cables, splitters, local gateways, etc.). Devices within customer premises network 110 may be connected via wired (e.g., coaxial cable, Telecommunications Industry Association category 5 ("cat 5") cable, etc.) or wireless connections (e.g., using network devices such as those available under the IEEE 802.11 wireless LAN standards) to form a LAN. In the example shown in FIG. 1, customer premises network 110 may connect to base station 120 through a two-way wireless connection, such as using a LTE band frequency, and may connect to satellite network 150 through a one-way (e.g., downlink) wireless connection, such as using a satellite television (TV) band frequency. The two-way wireless connection and the one-way wireless connection may be implemented using combined gateway equipment 115.

Combined gateway equipment 115, which is described in more detail below, may generally include mechanisms for communicating with satellite network 150 (to provide satellite-based communications) and for communicating with base station 120 (to provide RF-based communications). Combined gateway equipment 115 may connect, such as via a coaxial connection, to devices inside of the customer premises, such as the devices connected to customer premises network 110.

Base station 120 may include one or more computation and/or communication devices that receive voice and/or data (e.g., video content) from service provider 140 (e.g., via network 130) and transmit that voice and/or data to customer premises network 110. Base station 120 may also include one or more devices that receive voice and/or data from customer premises network 110 and transmit that voice and/or data to service provider 140 (e.g., via network 130). In one example implementation, base station 120 may utilize LTE standards operating in a 700 megahertz (MHz) frequency band.

Network 130 may include a local area network (LAN), a wide area network (WAN), a metropolitan area network (MAN), a telephone network, such as the Public Switched Telephone Network (PSTN), an intranet, the Internet, an optical fiber (or fiber optic)-based network, a cable television network, a satellite television network, or a combination of networks.

Service provider 140 may include one or more server devices, or other types of computation or communication devices, that gather, process, search, and/or provide information in a manner described herein. In one implementation, service provider 140 may include a web server, a computer system, an application, a cable head-end, and/or a broadcasting device capable of providing Internet protocol (IP)-based content and/or services to devices in customer premises network 110.

Satellite network 150 may provide multimedia content from, for example, a direct broadcast satellite (DBS) service provider (not shown). Satellite network 150 may provide a downlink signal over a designated satellite TV band frequency, typically in the range of 950 MHz to 2150 MHz. The downlink signal may be received using a satellite antenna/receiver system at the customer premises to present satellite TV content to a user.

In implementations described herein, customer premises network 110 may combine LTE functionality with satellite TV service. Using combined gateway equipment 115, which includes an outdoor LTE module, both broadband (over LTE) service (e.g., via base station 120) and satellite TV service (e.g., via satellite network 150) may be brought into customer premises network 110 over a single coaxial line. This architecture may reduce equipment installation time due to the use of a single coaxial line for all the services. Both installation costs and recurrent operational costs can be reduced.

While implementations herein are described primarily in the context of broadband services via LTE, other wireless protocols may be used. For example, components conforming to LTE standards described herein may be replaced by components conforming to other network protocols, such as, for example, Global System for Mobile Communications (GSM), wideband code division multiple access (WCDMA), Ultra Mobile Broadband (UMB), Universal Mobile Telecommunications System (UMTS), Code Division Multiple Access 2000 (CDMA2000), High-Speed Packet Access (HSPA), Worldwide Interoperability for Microwave Access (WiMax), etc.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more other tasks described as being performed by one or more other components of environment 100.

Figure 2:
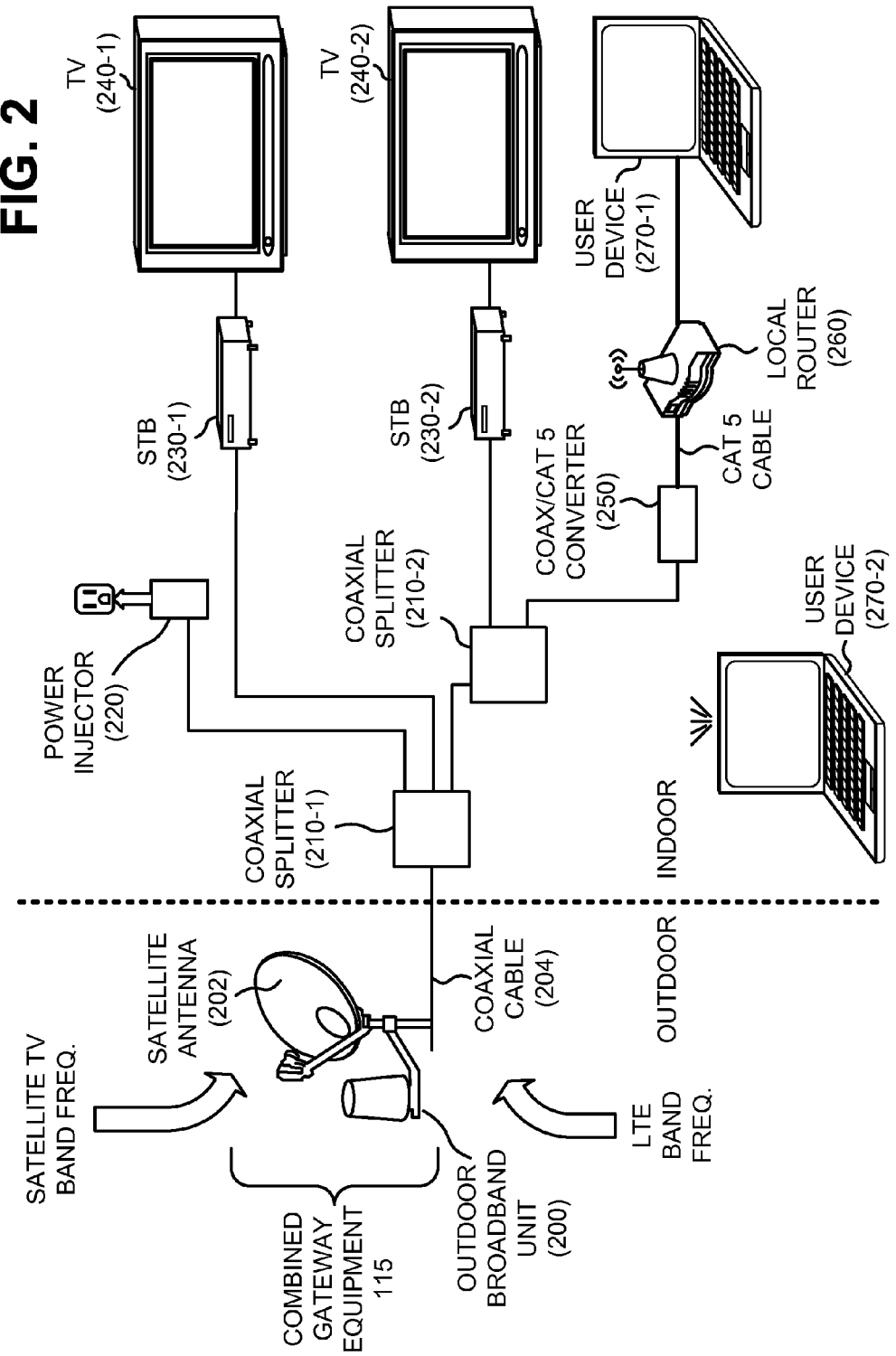
FIG. 2 is a diagram of an example customer premises network illustrated in FIG. 1 according to an implementation described herein.

FIG. 2 is a diagram of an example customer premises network 110 according to an implementation described herein. As illustrated, combined gateway equipment 115 of customer premises network 110 may include an outdoor broadband unit 200 and a satellite antenna 202. A coaxial cable 204 may connect combined gateway equipment 115 to the indoor portion of customer premises network 110. Customer premises network 110 may further include coaxial splitters 210-1 and 210-2 (referred to herein collectively as "coaxial splitters 210" or generically as "coaxial splitter 210"), a power injector 220, set-top boxes (STBs) 230-1 and 230-2 (referred to herein collectively as "STBs 230" or generically as "STB 230"), televisions 240-1 and 240-2 (referred to herein collectively as "televisions 240"), a coax/Cat 5 converter 250, a local router 260, and user devices 270-1 and 270-2 (referred to herein collectively as "user devices 270" or generically as "user device 270"). One outdoor broadband unit 200, two coaxial splitters 210, one power injector 220, two STBs 230, two televisions 240, one coax/Cat 5 converter 250, one local router 260, and two user devices 270 have been illustrated in FIG. 2 for simplicity. In practice, there may be more (or fewer) outdoor broadband units 200, satellite antennas 202, coaxial splitters 210, power injectors 220, STBs 230, televisions 240, coax/Cat 5 converters 250, local routers 260, and/or user devices 270.

Outdoor broadband unit 200 may include one or more data processing and/or data transfer devices, such as a gateway, a router, a modem, a switch, a firewall, a network interface card (NIC), a hub, a bridge, a proxy server, an optical add-drop multiplexer (OADM), or some other type of device that processes and/or transfers data. In one example, outdoor broadband unit 200 may include a wireless gateway that provides a convergence point between wireless protocols (e.g., associated with base station 120) and IP protocols (e.g., associated with user devices 270). Outdoor broadband unit 200 may be physically deployed with satellite antenna 202 (e.g., on a roof or a side wall of a house associated with customer premises network 110) as part of combined gateway 115. For example, outdoor broadband unit 200 may utilize a pre-existing or a new satellite TV installation in a way that both broadband (over LTE) service and satellite TV are brought indoors (e.g., inside the customer premises) over a coaxial cable 204. Outdoor broadband unit 200 is discussed further in connection with, for example, FIGS. 3 and 5.

Satellite antenna 202 may provide an interface for television service broadcast from satellites. In one implementation, satellite antenna 202 may provide an entry point for a network (e.g., customer premises network 110) that conforms to standards of the Multimedia over Coax Alliance (MoCA). Generally, MoCA-compliant devices may be used to implement a home network on existing coaxial cable, using, for example, orthogonal frequency-division multiplexing (OFDM) modulation that divides data into several parallel data streams or logical channels. Channel stacking technology, such as Single Wire Multiswitch (SWiM) technology, may be used to allocate logical channels using frequency blocks for user-selected programming to the SWiM compatible devices (e.g., STBs 230). Satellite antenna 202 may communicate with STB 230 to identify which blocks of channels can be used to send television signals to that particular STB 230.

Coaxial splitters 210 may include conventional splitting technologies to filter LTE and satellite TV signals. In one implementation, each coaxial splitter 210 may include a SWiM splitter. For example, coaxial splitters 210 may facilitate allocating logical channels using different frequency blocks for viewer-selected television programming and broadband signals to the SWiM-compatible STBs 230 and/or local router 260.

Power injector 220 may include a conventional mechanism for injecting direct current (DC) power in a coaxial cable to power remotely-located devices, such as outdoor broadband unit 200. Use of power injector 220 may allow components of outdoor broadband unit 200 to be powered via a coaxial cable (e.g., coaxial cable 204) and eliminate the need for additional wiring.

STB 230 may include a device that receives and/or processes video content (e.g., from a satellite TV provider via satellite antenna 202), and provides the video content to television 240 or another device. STB 230 may also include decoding and/or decryption capabilities and may further include a digital video recorder (DVR) (e.g., a hard drive). In one example implementation, STB 230 may be incorporated directly within television 240. In another implementation, STB 230 and/or television 240 may be replaced with a computing device (e.g., a personal computer, a laptop computer, a tablet computer, etc.), a cable card, a TV tuner card, or a portable communication device (e.g., a mobile telephone or a personal digital assistant (PDA)). In one implementation, STB 230 may conform to MoCA and SWiM standards.

Television 240 may include a television monitor that is capable of displaying video content, television programming, content provided by STB 230, and/or content provided by other devices (e.g., a digital video disk (DVD) player, a video camera, etc., not shown) connected to television 240. Coax-to-Cat 5 converter 250 may include a conventional device to convert incoming signals from coaxial cables to outgoing signals on Cat 5 cables.

Local router 260 may include a device that may provide connectivity between equipment within customer premises (e.g., user devices 270) and between the customer premises equipment and an external network (e.g., network 130). In one implementation, local router 260 may include a wireless access point that employs one or more short-range wireless communication protocols for a wireless personal area network (WPAN) and/or a wireless local area network (WLAN), such as, for example, IEEE 802.15 (e.g., Bluetooth) and IEEE 802.11 (e.g., Wi-Fi). In other implementations, different short-range wireless protocols and/or frequencies may be used. Local router 260 may also include one or more wired (e.g., Ethernet) connections. In one implementation, local router 260 may include a Universal Serial Bus (USB) Ethernet Router that is capable of meeting LTE quality of service (QoS) standards.

User device 270 may include any device that is capable of communicating with customer premises network 110 via local router 260. For example, user device 270 may include a mobile computation and/or communication device, such as a laptop computer, a radiotelephone, a personal communications system (PCS) terminal (e.g., that may combine a cellular radiotelephone with data processing and data communications capabilities), a PDA (e.g., that can include a radiotelephone, a pager, Internet/intranet access, etc.), a wireless device, a smart phone, a global positioning system (GPS) device, a content recording device (e.g., a camera, a video camera, etc.), etc. In another example, user device 270 may include a fixed (e.g., provided in a particular location, such as within a customer's home) computation and/or communication device, such as a laptop computer, a personal computer, a tablet computer, a gaming system, etc.

Although FIG. 2 shows example components of customer premises network 110, in other implementations, customer premises network 110 may contain fewer components, different components, differently arranged components, and/or additional components than those depicted in FIG. 2. Alternatively, or additionally, one or more components of customer premises network 110 may perform one or more other tasks described as being performed by one or more other components of customer premises network 110.

Figure 3:
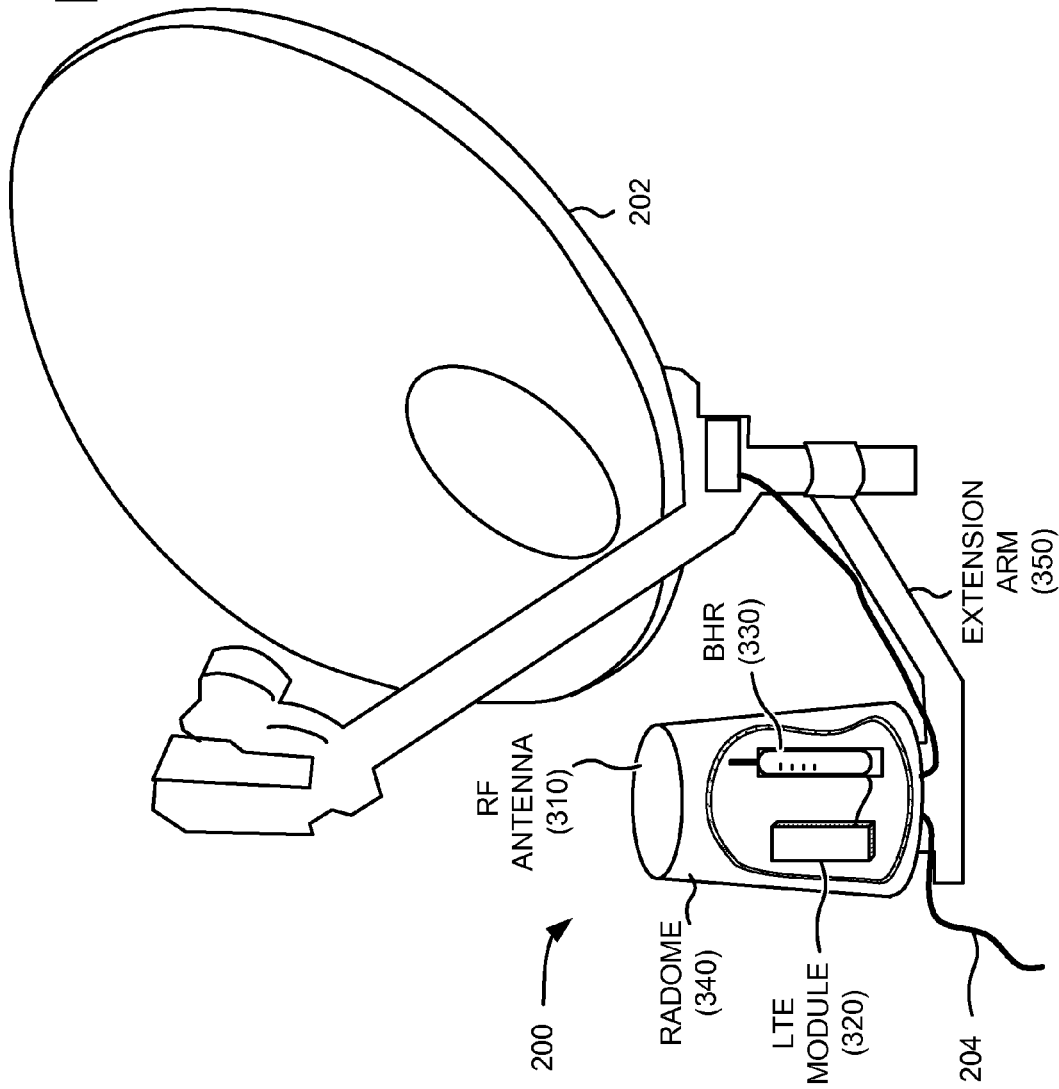
FIG. 3 is a diagram of example components of an outdoor portion of the customer premises network depicted in FIG. 2.

FIG. 3 is a diagram of example components of combined gateway equipment 115 of customer premises network 110. As illustrated, combined gateway equipment 115 may include outdoor broadband unit 200 and satellite antenna 202. Outdoor broadband unit 200 and satellite antenna 202 my include features described above in connection with, for example, FIGS. 1 and 2. Outdoor broadband unit 200 may include a radio frequency (RF) antenna 310, a LTE module 320, and a broadband home router (BHR) 330, all housed in a radome 340. In one implementation, as shown in FIG. 3, outdoor broadband unit 200 may be mounted on an extension arm 350 connected to a pole supporting satellite antenna 202.

RF antenna 310 may include an antenna to transmit and/or receive RF signals over the air. RF antenna 310 may, for example, receive RF signals from LTE module 320/BHR 330 and transmit the RF signals over the air. Also, RF antenna 310 may, for example, receive RF signals over the air and provide them to LTE module 320/BHR 330. In one implementation, for example, LTE module 320/BHR 330 may communicate with a base station (e.g., base station 120) connected to a network (e.g., network 130) to send and/or receive signals from user devices 270. In implementations herein, RF antenna 310 may be enclosed by radome 340, integrated with radome 340, or external to radome 340. While one RF antenna 310 is shown in FIG. 3, outdoor broadband unit 200 may include more than one antenna in other implementations.

In one implementation, RF antenna 310 may include a wideband multiple beam antenna, with partially overlapping antenna beams, spanning 360 degrees in azimuth (x-y plane). For example, antenna 310 may include between four and eight beams to achieve desirable antenna gains and reduction of interference. Additionally, or alternatively, RF antenna 310 may employ two polarizations per beam for 2×2 downlink multiple-input and multiple-output (MIMO) operation.

In another implementation, RF antenna 310 may include a fixed dually-polarized directional antenna. As a directional antenna, RF antenna 310 may use polarizations matched to the polarizations of a particular base station (e.g., base station 120). For example, a polarization of RF antenna 310 may match a polarization of a serving enhanced Node B (eNB) or base station (e.g., base station 120). Antenna pointing for the directional antenna may be conducted, for example, during installation of outdoor broadband unit 200.

LTE module 320 may include a device (e.g., a modem) with communication capability via an air interface. For example, LTE module 320 may receive broadband signals and/or voice over Internet protocol (VoIP) signals from base station 120 (e.g., via RF antenna 310) and may transmit broadband signals and/or VoIP signals to base station 120 (e.g., via RF antenna 310). LTE module 320 may employ frequency division duplex (FDD) and/or time division duplex (TDD) techniques to facilitate downlink and uplink transmissions. In one implementation, LTE module 320 may include a beam selection mechanism that selects the best antenna beam, from RF antenna 310, according to a certain optimization criteria. Beam selection may be performed, for example, during initial installation and/or regular maintenance of outdoor broadband unit 200. Additionally, or alternatively, LTE module 320 may select any of the RF antenna 310 beams, based on real-time measurements, during normal operation.

BHR 330 may include a device for buffering and forwarding data packets toward destinations. For example, BHR 330 may receive data packets from base station 120 (e.g., via LTE module 320) and may forward the data packets toward user devices 270. In addition, BHR 330 may receive data packets from user devices 270 (e.g., via local router 260) and may forward the data packets toward recipient devices (e.g., service provider 140) via network 130.

In one example implementation, BHR 330 may be associated with a coaxial network controller (not shown) that provides an interface for Ethernet over coaxial signals, such as signals transmitted over coaxial cable 204 and into customer premises network 110. The coaxial network controller may act as a bridge device to receive signals from LTE module 320 via a wired USB connection and to convert the signals to an Ethernet over coax signal. The Ethernet over coax signal may be assigned a logical channel (e.g., according to SWiM guidelines) and may be combined with coaxial input from satellite antenna 202. In one implementation, the output from coaxial network controller may be inserted in a Mid-RF MoCA channel that is separate from the 950 MHz to 2150 MHz range of a typical satellite TV system.

Radome 340 (shown with a cut-away view to reveal LTE module 320 and BHR 330) may provide a weatherproof enclosure to protect RF antenna 310, LTE module 320, BHR 330, and/or other components of outdoor broadband unit 200. Generally, radome 340 may include any RF transparent structure that protects components in an outdoor environment.

Combined gateway equipment 115 may be integrated with the SWiM environment associated with satellite antenna 202 to provide both TV service and broadband wireless service. With this architecture, combined gateway equipment 115 may require only one coax line leading from outdoor broadband unit 200/satellite antenna 202. This single coaxial line may feed the in-home coaxial installation to deliver satellite TV service and LTE service to corresponding STBs 230 and user devices 270 (e.g., as shown in FIG. 2). Components of outdoor broadband unit 200, such as RF antenna 310, LTE module 320, and BHR 330, may be powered using coax cable 204.

Although FIG. 3 shows example components of combined gateway equipment 115, in other implementations, combined gateway equipment 115 may contain fewer components, different components, differently arranged components, and/or additional components than depicted in FIG. 3. Alternatively, or additionally, one or more components of combined gateway equipment 115 may perform one or more other tasks described as being performed by one or more other components of combined gateway equipment 115. In one alternative implementation, one or more functions of combined gateway equipment 115 may be moved to another location, such as internal to the customer premises. For example, a bridge may be installed in combined gateway equipment 115 instead of BHR 330. The bridge may function to combine coaxial input from satellite antenna 202 with the output from LTE module 320 into a single coax line, which may be forwarded to a broadband router that is installed inside the customer premises.

Figure 4:
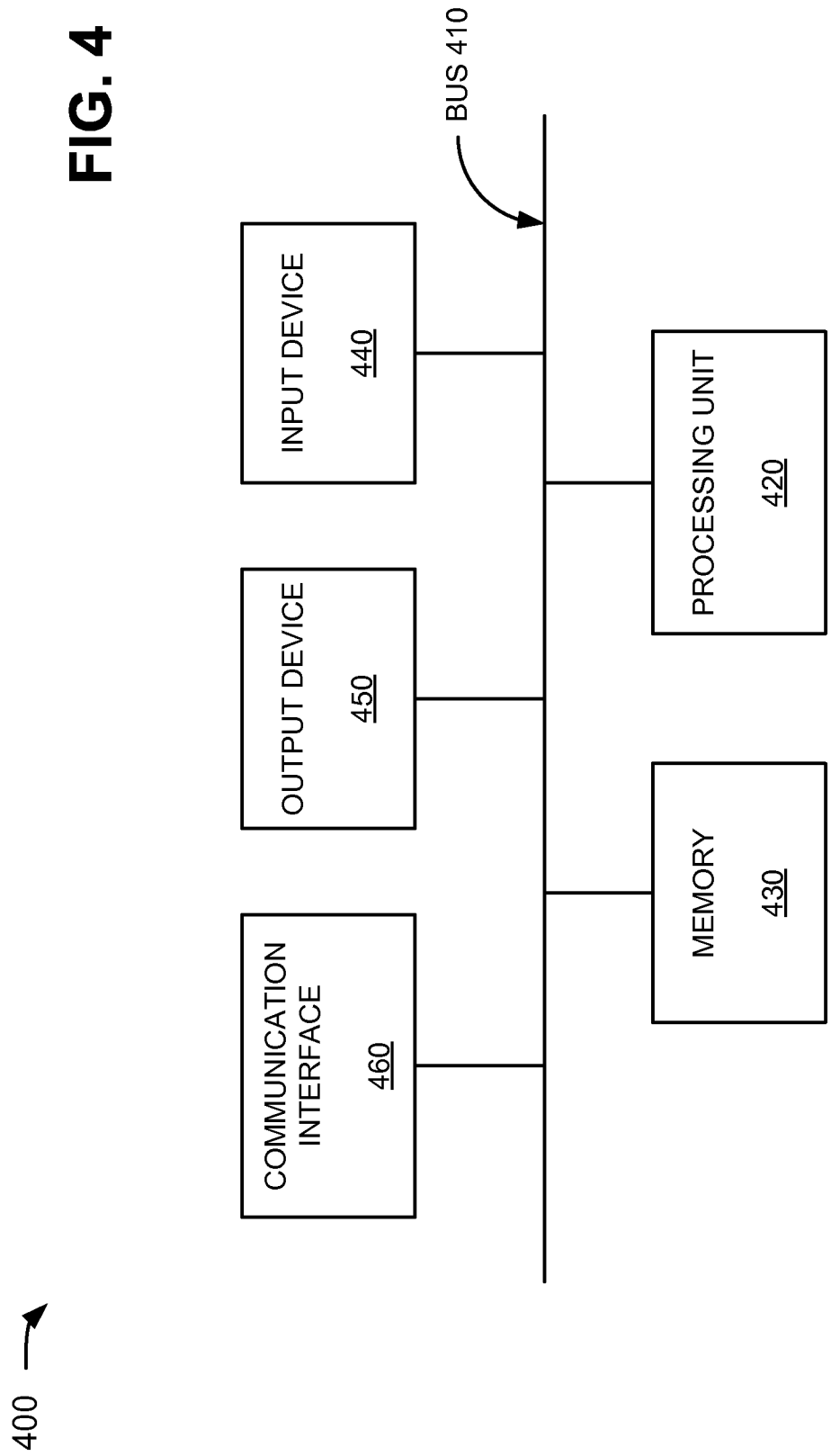
FIG. 4 is a diagram of example components of a device that may correspond to one of the devices of in FIG. 1 or 2.

FIG. 4 is a diagram of example components of a device 400 that may correspond to one of the devices of environment 100 and/or customer premises network 110 (e.g., LTE module 320 and/or BHR 330). As illustrated, device 400 may include a bus 410, a processing unit 420, a memory 430, an input device 440, an output device 450, and a communication interface 460.

Bus 410 may permit communication among the components of device 400. Processing unit 420 may include one or more processors or microprocessors that interpret and execute instructions. In other implementations, processing unit 420 may be implemented as or include one or more application specific integrated circuits (ASICs), field programmable gate arrays (FPGAs), or the like.

Memory 430 may include a random access memory (RAM) or another type of dynamic storage device that stores information and instructions for execution by processing unit 420, a read only memory (ROM) or another type of static storage device that stores static information and instructions for the processing unit 420, and/or some other type of magnetic or optical recording medium and its corresponding drive for storing information and/or instructions.

Input device 440 may include a device that permits an operator to input information to device 400, such as a keyboard, a keypad, a mouse, a pen, a microphone, one or more biometric mechanisms, and the like. Output device 450 may include a device that outputs information to the operator, such as a display, a speaker, etc.

Communication interface 460 may include any transceiver-like mechanism that enables device 400 to communicate with other devices and/or systems. For example, communication interface 460 may include mechanisms for communicating with other devices, such as other devices of environment 100 and/or customer premises network 110.

As described herein, device 400 may perform certain operations in response to processing unit 420 executing software instructions contained in a computer-readable medium, such as memory 430. A computer-readable medium may be defined as a non-transitory memory device. A memory device may include space within a single physical memory device or spread across multiple physical memory devices. The software instructions may be read into memory 430 from another computer-readable medium or from another device via communication interface 460. The software instructions contained in memory 430 may cause processing unit 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may contain fewer components, different components, differently arranged components, or additional components than depicted in FIG. 4. Alternatively, or additionally, one or more components of device 400 may perform one or more other tasks described as being performed by one or more other components of device 400.

Figure 5:
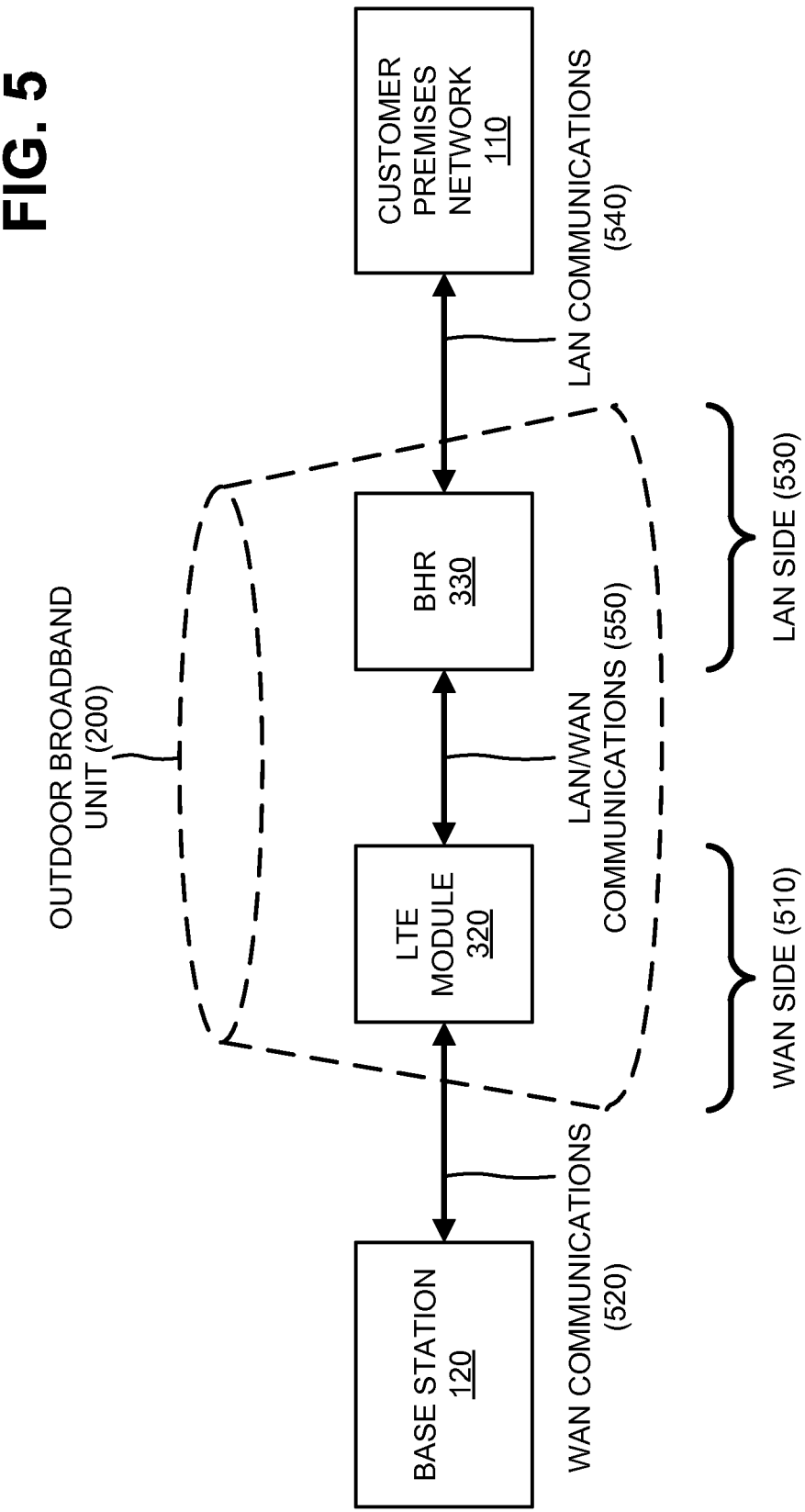
FIG. 5 is a diagram of example operations capable of being performed by an example portion of the environment illustrated in FIG. 1.

FIG. 5 is a diagram of example operations capable of being performed by an example portion 500 of environment 100. As shown in FIG. 5, environment portion 500 may include customer premises network 110, base station 120, outdoor broadband unit 200, LTE module 320, and BHR 330. Customer premises network 110, base station 120, outdoor broadband unit 200, LTE module 320, and BHR 330 may include the features described above in connection with one or more of, for example, FIGS. 1-4.

As further shown in FIG. 5, LTE module 320 may make up a WAN side 510 of outdoor broadband unit 200 since LTE module 320 may be associated with a WAN provided via base station 120 and/or network 130 (not shown). In one example implementation, LTE module 320 may be referred to as a "WAN side network device" or a "WAN side device" of outdoor broadband unit 200. Base station 120 and LTE module 320 may exchange WAN communications 520. WAN communications 520 may include wireless protocol-based communications associated with the broadband (over LTE) service information exchanged between base station 120 and outdoor broadband unit 200. In one example implementation, WAN communications 520 may include authentication communications (e.g., username and password configurations), provisioning communications associated with outdoor broadband unit 200, etc.

BHR 330 may make up a LAN side 530 of outdoor broadband unit 200 since BHR 330 may be associated with a LAN provided via customer premises network 110. In one example implementation, BHR 330 may be referred to as a "LAN side network device" or a "LAN side device" of outdoor broadband unit 200. Customer premises network 110 and BHR 330 may exchange LAN communications 540. LAN communications 540 may include IP protocol-based communications associated with information exchanged between customer premises network 110 (e.g., user devices 270) and outdoor broadband unit 200. In one example implementation, LAN communications 540 may include requests for video content, requests for audio content, etc.

As further shown in FIG. 5, LTE module 320 and BHR 330 may exchange LAN/WAN communications 550. LAN/WAN communications 550 may include communications that enable outdoor broadband unit 200 to provide a convergence point between wireless protocols (e.g., associated with base station 120) and IP protocols (e.g., associated with user devices 270 of customer premises network 110). Examples of LAN/WAN communications 550 are provided below in connection with FIGS. 6-8.

Although FIG. 5 shows example components of environment portion 500, in other implementations, environment portion 500 may include fewer components, different components, differently arranged components, or additional components than depicted in FIG. 5. Alternatively, or additionally, one or more components of environment portion 500 may perform one or more other tasks described as being performed by one or more other components of environment portion 500.

Figure 6:
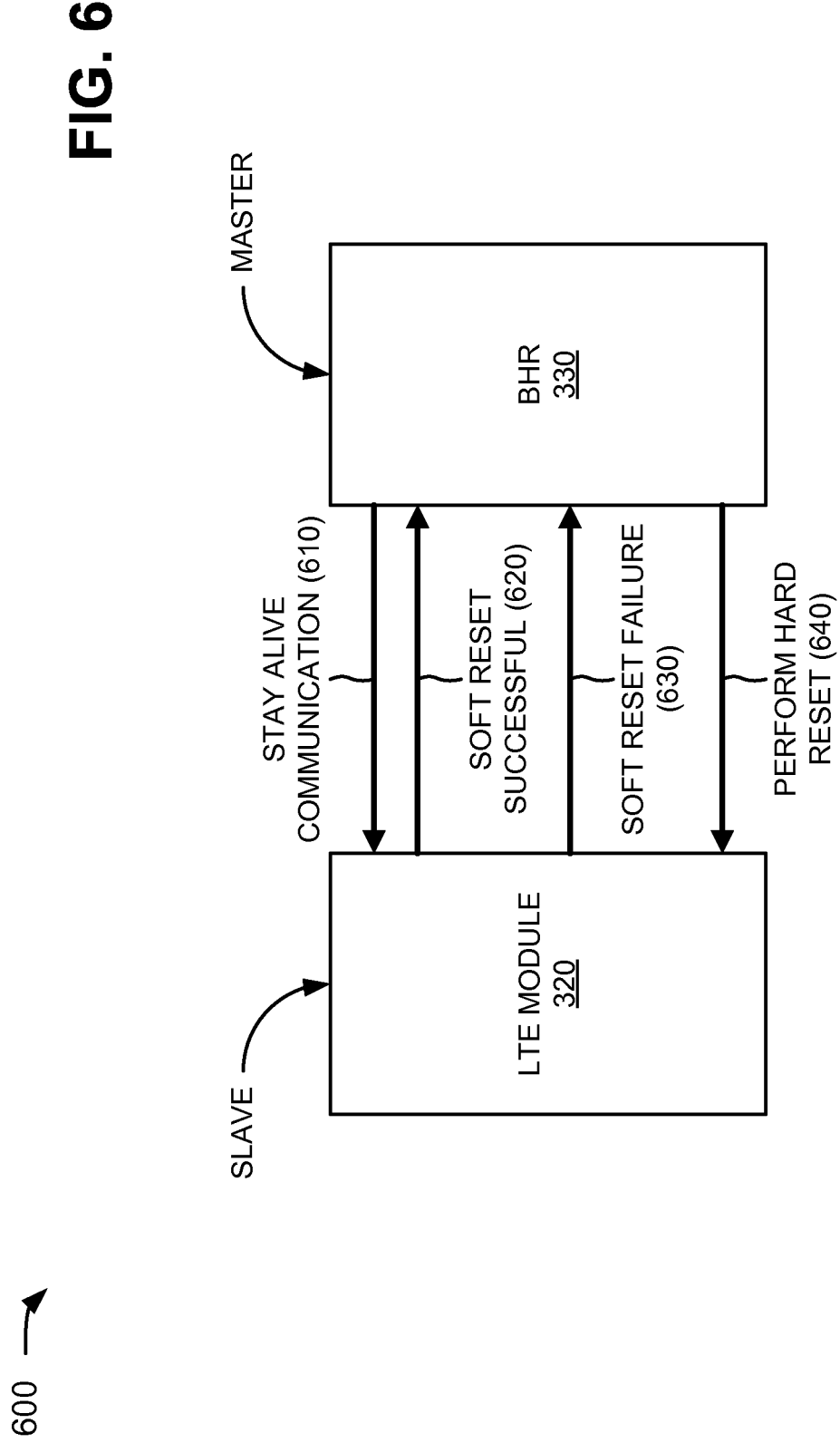
FIG. 6 is a diagram of example operations capable of being performed by an example portion of an outdoor broadband unit depicted in FIG. 2.

FIG. 6 is a diagram of example operations capable of being performed by an example portion 600 of outdoor broadband unit 200. As shown in FIG. 6, portion 600 of outdoor broadband unit 200 may include LTE module 320 and BHR 330. LTE module 320 and BHR 330 may include the features described above in connection with one or more of, for example, FIGS. 1-5.

As further shown in FIG. 6, when there is no activity associated with the LAN (e.g., customer premises network 110) connected to BHR 330, LTE module 320 may enter a dormant state with respect to BHR 330 and may function as a "slave" device to a "master" device, such as BHR 330. In order to maintain connectivity with LTE module 320, BHR 330 may provide a stay alive communication 610 to LTE module 320. Stay alive communication 610 may include information instructing LTE module 320 to perform a soft reset that causes LTE module 320 to restart without powering down LTE module 320. The soft reset may be performed by hardware or a combination of hardware and software components of LTE module 320, and may enable LTE module 320 to maintain connectivity with BHR 330. In one example implementation, BHR 330 may utilize a particular time interval (e.g., X seconds, minutes, etc.), and may generate stay alive communication 610 every particular time interval (e.g., every X seconds, minutes, etc.). The particular time interval may be pre-programmed into BHR 330 or may be provided to BHR 330 by a network administrator (e.g., associated with network 130).

LTE module 320 may receive stay alive communication 610, and may attempt to perform a soft reset based on stay alive communication 610. If LTE module 320 successfully performs the soft reset, LTE module 320 may provide, to BHR 330, an indication 620 that the soft reset was successful. If LTE module 320 unsuccessfully performs the soft reset, LTE module 320 may provide, to BHR 330, an indication 630 that the soft reset failed or BHR 330 may receive no response from LTE module 320. BHR 330 may receive indication 620 or 630 (or no response), and may determine whether the soft reset was successful or unsuccessful based on the received indication. If BHR 330 receives indication 620, BHR 330 may maintain connectivity with LTE module 320 via stay alive communication 610. If BHR 330 receives indication 630 or no response, BHR 330 may determine whether indication 630 has been received (i.e., the soft reset failed in LTE module 320) more than a predetermined number of times. If BHR 330 determines that indication 630 has been received less than or equal to the predetermined number of times, BHR 330 may provide stay alive communication 610 to LTE module 320 again. If BHR 330 determines that indication 630 has been received more than the predetermined number of times, BHR 330 may provide, to LTE module 320, a command 640 instructing LTE module 320 to perform a hard reset. When LTE module 320 receives command 640, LTE module 320 may perform a hard reset (e.g., may power down and power up) in order to re-establish connectivity with BHR 330.

Although FIG. 6 shows example components of portion 600 of outdoor broadband unit 200, in other implementations, outdoor broadband unit 200 may include fewer components, different components, differently arranged components, or additional components than depicted in FIG. 6. Alternatively, or additionally, one or more components of portion 600 of outdoor broadband unit 200 may perform one or more other tasks described as being performed by one or more other components of portion 600 of outdoor broadband unit 200.

FIG. 7 is a diagram of other example operations capable of being performed by an example portion 700 of outdoor broadband unit 200. As shown in FIG. 7, portion 700 of outdoor broadband unit 200 may include LTE module 320 and BHR 330. LTE module 320 and BHR 330 may include the features described above in connection with one or more of, for example, FIGS. 1-6.

As further shown in FIG. 7, when there is activity associated with the WAN connected to LTE module 320, LTE module 320 may function as a "master" device and BHR 330 may function as a "slave" device. LTE module 320 may receive an indication of an abnormal network event, such as a network outage 710, a network overload, etc., from a network provided by base station 120 and network 130. When LTE module 320 receives network outage 710, LTE module 320 may disconnect from the network by disconnecting from base station 120 (not shown), as indicated by reference number 720. LTE module 320 may also provide, to BHR 330, a command 730 instructing BHR 330 to enter into a standby mode until the abnormal network event (e.g., network outage 710) ends. LTE module 320 may provide, to BHR 330, another command 740 instructing BHR 330 to cease all communications with LTE module 320. In one example implementation, commands 730 and 740 may combined into a single command, and the standby mode may include BHR 330 ceasing all communications with LTE module 320. BHR 330 may receive commands 730 and 740, may enter a standby mode based on command 730, and may cease all communications with LTE module 320 based on command 740.

When network outage 710 ends, the network may provide an indication to LTE module 320 of the expiration of network outage 710. After network outage 710 ends, LTE module 320 may request to renew an address (e.g., an IP address) with the network provided by base station 120, as indicated by reference number 750, and may receive an IP address 760 from the network based on the request. After network outage 710 ends, LTE module 320 may provide, to BHR 330, a command 770 instructing BHR 330 to enter into a normal mode and to resume all communications with LTE module 320. BHR 330 may receive command 770, may enter a normal mode based on command 770, and may resume all communications with LTE module 320 based on command 770.

Although FIG. 7 shows example components of portion 700 of outdoor broadband unit 200, in other implementations, outdoor broadband unit 200 may include fewer components, different components, differently arranged components, or additional components than depicted in FIG. 7. Alternatively, or additionally, one or more components of portion 700 of outdoor broadband unit 200 may perform one or more other tasks described as being performed by one or more other components of portion 700 of outdoor broadband unit 200.

FIG. 8 is a diagram of further example operations capable of being performed by an example portion 800 of outdoor broadband unit 200. As shown in FIG. 8, portion 800 of outdoor broadband unit 200 may include LTE module 320 and BHR 330. LTE module 320 and BHR 330 may include the features described above in connection with one or more of, for example, FIGS. 1-7.

As further shown in FIG. 8, when there is activity associated with the WAN connected to LTE module 320, LTE module 320 may function as a "master" device and BHR 330 may function as a "slave" device. BHR 330 may receive a high priority communication 810 and low priority communications 820, and may provide high priority communication 810 and low priority communications 820 to LTE module 320. A priority of a communication may be determined based on a type of communication. For example, high priority communication 810 may include an emergency (a "911" or "E911") call for services provided by an emergency entity (e.g., a fire department, a police station, an ambulance service, etc.). Alternatively, LTE module 320 may receive high priority communication 810 from a network provided by base station 120 (not shown). In such a situation, high priority communication 810 may include an emergency broadcast from a government agency providing information associated with an emergency (e.g., an Amber alert, a weather alert, etc.). Low priority communications 820 may include communications, from user devices 270 of customer premises network 110, requesting services, such as requesting a television program, requesting a video download, requesting audio content, etc.

LTE module 320 may receive high priority communication 810 and low priority communications 820, and may forward high priority communication 810 to the network associated with base station 120. For example, LTE module 320 may forward an emergency call to base station 120 so that the emergency call can be connected to an emergency entity. When LTE module 320 receives high priority communication 810, LTE module 320 may not forward low priority communications 820 to the network associated with base station 120, and may provide, to BHR 330, a command 830 instructing BHR 330 to minimize transmission of low priority communications 820 until high priority communication 810 is complete. BHR 330 may receive command 830, and may minimize transmission of low priority communications 820 based on command 830, as indicated by reference number 840. For example, BHR 330 may throttle back low priority communications 820 to predetermined bandwidth or may stop one or more low priority communications 820.

LTE module 320 may monitor high priority communication 810 to determine when high priority communication is complete. When high priority communication 810 is complete, LTE module 320 may provide, to BHR 330, a command 850 instructing BHR 330 resume low priority communications 820. BHR 330 may receive command 850, and may resume low priority communications 820 based on command 850.

Although FIG. 8 shows example components of portion 800 of outdoor broadband unit 200, in other implementations, outdoor broadband unit 200 may include fewer components, different components, differently arranged components, or additional components than depicted in FIG. 8. Alternatively, or additionally, one or more components of portion 800 of outdoor broadband unit 200 may perform one or more other tasks described as being performed by one or more other components of portion 800 of outdoor broadband unit 200.

FIG. 9 is a flow chart of an example process 900 for maintaining communications between a WAN side and a LAN side of the outdoor broadband unit according to implementations described herein. In one implementation, process 900 may be performed by BHR 330 of outdoor broadband unit 200. In another implementation, some or all of process 900 may be performed by another device or group of devices, including or excluding BHR 330.

As shown in FIG. 9, process 900 may include providing a stay alive communication, at a time interval, to a WAN side network device provided in an outdoor broadband unit (block 910). For example, in implementations described above in connection with FIG. 6, in order to maintain connectivity with LTE module 320, BHR 330 may provide stay alive communication 610 to LTE module 320. Stay alive communication 610 may include information instructing LTE module 320 to perform a soft reset that causes LTE module 320 to restart without powering down LTE module 320. The soft reset may be performed by hardware or a combination of hardware and software components of LTE module 320, and may enable LTE module 320 to maintain connectivity with BHR 330. In one example, BHR 330 may determine a particular time interval (e.g., X seconds, minutes, etc.), and may generate stay alive communication 610 every particular time interval (e.g., every X seconds, minutes, etc.).

As further shown in FIG. 9, process 900 may include receiving a soft reset result from the WAN side network device based on the stay alive communication (block 920), and determining, based on the result, whether the soft reset of the WAN side network device is successful or unsuccessful (block 930). If the soft reset is successful (block 930-SUCCESSFUL), process 900 may return to process block 910. For example, in implementations described above in connection with FIG. 6, LTE module 320 may receive stay alive communication 610, and may attempt to perform a soft reset based on stay alive communication 610. If LTE module 320 successfully performs the soft reset, LTE module 320 may provide, to BHR 330, indication 620 that the soft reset was successful. If LTE module 320 unsuccessfully performs the soft reset, LTE module 320 may provide, to BHR 330, indication 630 that the soft reset failed or may provide no response. BHR 330 may receive indication 620 or 630 (or no response), and may determine whether the soft reset was successful or unsuccessful based on the received indication. If BHR 330 receives indication 620, BHR 330 may maintain connectivity with LTE module 320 via stay alive communication 610.

Returning to FIG. 9, if the soft reset is unsuccessful (block 940—UNSUCCESSFUL), process 900 may include determining whether the soft reset is unsuccessful more than a number of times (block 940). If the soft reset is unsuccessful for less than or equal to the number times (block 940—NO), process 900 may return to process block 910. For example, in implementations described above in connection with FIG. 6, if BHR 330 receives indication 630 or no response, BHR 330 may determine whether indication 630 has been received (i.e., the soft reset failed in LTE module 320) more than a predetermined number of times. If BHR 330 determines that indication 630 has been received less than or equal to the predetermined number of times, BHR 330 may provide stay alive communication 610 to LTE module 320 again.

As further shown in FIG. 9, if the soft reset is unsuccessful for more than the number times (block 940—YES), process 900 may include providing a hard reset command to the WAN side network device, where the WAN side network device performs a hard reset based on the command (block 950). For example, in implementations described above in connection with FIG. 6, if BHR 330 determines that indication 630 has been received more than the predetermined number of times, BHR 330 may provide, to LTE module 320, command 640 instructing LTE module 320 to perform a hard reset. When LTE module 320 receives command 640, LTE module 320 may perform a hard reset (e.g., may power down and power up) in order to re-establish connectivity with BHR 330.

FIG. 10 is a flow chart of an example process 1000 for handling abnormal network events with an outdoor broadband unit according to implementations described herein. In one implementation, process 1000 may be performed by LTE module 320 of outdoor broadband unit 200. In another implementation, some or all of process 1000 may be performed by another device or group of devices, including or excluding LTE module 320.

As shown in FIG. 10, process 1000 may include receiving an indication of an abnormal network event associated with a WAN (block 1010), and disconnecting from the WAN based on the abnormal network event (block 1020). For example, in implementations described above in connection with FIG. 7, LTE module 320 may receive an abnormal network event, such as network outage 710, a network overload, etc., from a network provided by base station 120 and network 130. When LTE module 320 receives network outage 710, LTE module 320 may disconnect from the network by disconnecting from base station 120 (not shown), as indicated by reference number 720.

As further shown in FIG. 10, process 1000 may include instructing a LAN side network device, provided in the outdoor broadband unit, to enter a standby mode based on the abnormal network event (block 1030), and instructing the LAN side network device to cease communications based on the abnormal network event (block 1040). For example, in implementations described above in connection with FIG. 7, when LTE module 320 receives network outage 710, LTE module 320 may provide, to BHR 330, command 730 instructing BHR 330 to enter into a standby mode until the abnormal network event (e.g., network outage 710) ends. LTE module 320 may provide, to BHR 330, another command 740 instructing BHR 330 to cease all communications with LTE module 320. In one example, commands 730 and 740 may combined into a single command, and the standby mode may include BHR 330 ceasing all communications with LTE module 320. BHR 330 may receive commands 730 and 740, may enter a standby mode based on command 730, and may cease all communications with LTE module 320 based on command 740.

Returning to FIG. 10, process 1000 may include receiving an indication that the abnormal network event has ceased (block 1050), and instructing, based on the indication, the LAN side network device to enter a normal mode and resume communications (block 1060). For example, in implementations described above in connection with FIG. 7, when network outage 710 ends, the network may provide an indication to LTE module 320 of the expiration of network outage 710. After network outage 710 ends, LTE module 320 may request to renew an address (e.g., an IP address) with the network provided by base station 120, as indicated by reference number 750, and may receive IP address 760 from the network based on the request. After network outage 710 ends, LTE module 320 may provide, to BHR 330, command 770 instructing BHR 330 to enter into a normal mode and to resume all communications with LTE module 320. BHR 330 may receive command 770, may enter a normal mode based on command 770, and may resume all communications with LTE module 320 based on command 770.

FIG. 11 is a flow chart of an example process 1100 for handling high priority communications with the outdoor broadband unit according to implementations described herein. In one implementation, process 1100 may be performed by LTE module 320 of outdoor broadband unit 200. In another implementation, some or all of process 1000 may be performed by another device or group of devices, including or excluding LTE module 320.

As shown in FIG. 11, process 1100 may include receiving a high priority communication from a LAN side network device provided in the outdoor broadband unit (block 1110), providing the high priority communication to a WAN connected to the outdoor broadband unit (block 1120), and receiving low priority communications from the LAN side network device (block 1130). For example, in implementations described above in connection with FIG. 8, BHR 330 may receive high priority communication 810 and low priority communications 820, and may provide high priority communication 810 and low priority communications 820 to LTE module 320. Alternatively, LTE module 320 may receive high priority communication 810 from a network provided by base station 120 (not shown). LTE module 320 may receive high priority communication 810 and low priority communications 820, and may forward high priority communication 810 to the network associated with base station 120.

As further shown in FIG. 11, process 1100 may include instructing the LAN side network device to minimize transmission of the low priority communications until the high priority communication is complete (block 1140), and determining whether the high priority communication is complete (block 1150). If the high priority communication is complete (block 1150—YES), process 1100 may include instructing the LAN side network device to resume the low priority communications (block 1160). If the high priority communication is not complete (block 1150—NO), process 1100 may return to process block 1140.

For example, in implementations described above in connection with FIG. 8, when LTE module 320 receives high priority communication 810, LTE module 320 may provide, to BHR 330, command 830 instructing BHR 330 to minimize transmission of low priority communications 820 until high priority communication 810 is complete. BHR 330 may receive command 830, and may minimize low priority communications 820 based on command 830, as indicated by reference number 840. LTE module 320 may monitor high priority communication 810 to determine when high priority communication is complete. When high priority communication 810 is complete, LTE module 320 may provide, to BHR 330, command 850 instructing BHR 330 resume low priority communications 820. BHR 330 may receive command 850, and may resume low priority communications 820 based on command 850.

Systems and/or methods described herein may provide a CPE wireless architecture that includes combined gateway equipment. The combined gateway equipment may include satellite and RF antennas that are mounted (e.g., on a roof), by an installer, at a customer premises. The RF antenna may be associated with an outdoor broadband unit that includes a WAN side device (e.g., a LTE module) capable of communicating with a wireless network, such as a WAN. The outdoor broadband unit may also include a LAN side device (e.g., a BHR) capable of communicating with a LAN, such as a customer premises network. The LTE module and the BHR may communicate with one another to enable communications between the WAN and the LAN.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 9-11, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

The term "component," as used herein, is intended to be broadly construed to include hardware (e.g., a processor, a microprocessor, an ASIC, a FPGA, a chip, a memory device (e.g., a ROM, a RAM, etc.), etc.) or a combination of hardware and software (e.g., a processor, microprocessor, ASIC, etc. executing software contained in a memory device).

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a network device provided in an outdoor broadband unit, the method comprising:
    detecting, by the network device, a state of no activity associated with a Local Area Network (LAN) serviced by the network device;
    providing, by the network device and in response to detecting the state of no activity, a first stay alive communication to a wide area network (WAN) side network device provided in the outdoor broadband unit, wherein the first stay alive communication includes an instruction to cause the WAN side network device to perform a soft reset, wherein the soft reset causes the WAN side network device to restart without powering down;
    receiving, by the network device and based on the first stay alive communication, a soft reset result from the WAN side network device;
    determining, by the network device and based on the soft reset result, whether the soft reset of the WAN side network device is successful or unsuccessful; and
    providing, by the network device, a second stay alive communication to the WAN side network device when the soft reset of the WAN side network device is successful.

2. The method of claim 1, where, when the soft reset of the WAN side network device is unsuccessful, the method further comprises:
    determining whether the soft reset of the WAN side network device is unsuccessful more than a predetermined number;
    providing, by the network device, a third stay alive communication to the WAN side network device when the soft reset of the WAN side network device is successful less than or equal to the predetermined number; and
    providing a hard reset command to the WAN side network device when the soft reset of the WAN side network device is unsuccessful more than the predetermined number.

3. The method of claim 2, where the WAN side network device performs a hard reset based on the hard reset command.

4. The method of claim 1, where the stay alive communication is generated once every particular time interval.

5. A method implemented by a network device provided in an outdoor broadband unit, the method comprising:
    receiving, by the network device, an abnormal network event associated with a wide area network (WAN);
    disconnecting the network device from the WAN based on the abnormal network event;
    instructing, by the network device, a local area network (LAN) side network device, provided in the outdoor broadband unit, to enter a standby mode based on the abnormal network event; and
    instructing, by the network device, the LAN side network device to cease communications with the network device based on the abnormal network event.

6. The method of claim 5, further comprising:
    receiving an indication that the abnormal network event has ended; and
    instructing, based on the indication, the LAN side network device to resume communications with the network device.

7. The method of claim 5, where the abnormal network event includes an outage associated with the WAN or an overload associated with the WAN.

8. A method implemented by a network device provided in an outdoor broadband unit, the method comprising:
    receiving, by the network device, a high priority communication from a local area network (LAN) side network device provided in the outdoor broadband unit;
    providing, by the network device, the high priority communication to a wide area network (WAN) connected to the outdoor broadband unit;
    receiving, by the network device, a low priority communication from the LAN side network device, where the low priority communication has a priority that is less than a priority of the high priority communication; and instructing, by the network device, the LAN side network device to minimize transmission of the low priority communication until the high priority communication is complete.

9. The method of claim 8, further comprising:
determining whether the high priority communication is complete; and
instructing the LAN side network device to resume the low priority communication when the high priority communication is determined to be complete.

10. The method of claim 8, further comprising:
receiving another high priority communication from the WAN;
providing the other high priority communication to the LAN side network device; and
instructing the LAN side network device to minimize transmission of the low priority communication until the other high priority communication is complete.

11. An outdoor broadband unit, comprising:
a wide area network (WAN) side device; and
a local area network (LAN) side device configured to:
detect a state of no activity associated with a LAN serviced by the LAN side device;
provide, in response to detecting the state of no activity, a first stay alive communication to the WAN side device, wherein the first stay alive communication includes an instruction to cause the WAN side device to perform a soft reset, wherein the soft reset causes the WAN side network device to restart without powering down,
determine, based on the soft reset result, whether the soft reset of the WAN side device is successful or unsuccessful, and
provide a second stay alive communication to the WAN side device when the soft reset of the WAN side device is successful.

12. The outdoor broadband unit of claim 11, where, when the soft reset of the WAN side device is unsuccessful, the LAN side device is further to:
determine whether the soft reset of the WAN side device is unsuccessful more than a predetermined number,
provide a third stay alive communication to the WAN side device when the soft reset of the WAN side device is successful less than or equal to the predetermined number, and
provide a hard reset command to the WAN side device when the soft reset of the WAN side device is unsuccessful more than the predetermined number.

13. The outdoor broadband unit of claim 12, where the WAN side device is to:
perform a hard reset based on the hard reset command.

14. The outdoor broadband unit of claim 11, where the LAN side device generates the stay alive communication once every particular time interval.

15. The outdoor broadband unit of claim 11, where the WAN side device is to:
receive an abnormal network event associated with the WAN, and
instruct the LAN side device to cease communications with the WAN side device based on the abnormal network event.

16. The outdoor broadband unit of claim 15, where the WAN side device is further to:
receive an indication that the abnormal network event has ended, and
instruct, based on the indication, the LAN side device to resume communications with the WAN side device.

17. The outdoor broadband unit of claim 15, where the abnormal network event includes an outage associated with the WAN or an overload associated with the WAN.

18. The outdoor broadband unit of claim 11, where the WAN side device is to:
receive a high priority communication from the LAN side device,
provide the high priority communication to the WAN,
receive a low priority communication from the LAN side device, where the low priority communication has a priority that is less than a priority of the high priority communication, and
instruct the LAN side device to minimize transmission of the low priority communication until the high priority communication is complete.

19. The outdoor broadband unit of claim 18, where the WAN side device is further to:
determine whether the high priority communication is complete, and
instructing the LAN side device to resume the low priority communication when the high priority communication is determined to be complete.

20. The outdoor broadband unit of claim 18, where the WAN side device is further to:
receive another high priority communication from the WAN,
provide the other high priority communication to the LAN side device, and
instruct the LAN side device to minimize transmission of the low priority communication until the other high priority communication is complete.

* * * * *